United States Patent
Roy et al.

(10) Patent No.: US 9,438,041 B2
(45) Date of Patent: Sep. 6, 2016

(54) SYSTEM AND METHOD FOR ENERGY DISTRIBUTION

(71) Applicants: Bosch Energy Storage Solutions LLC, Farmington Hills, MI (US); Robert Bosch GmbH, Stuttgart (DE)

(72) Inventors: Binayak Roy, Sunnyvale, CA (US); Maksim Subbotin, San Carlos, CA (US); Ashish S. Krupadanam, Cupertino, CA (US); Jasim Ahmed, Mountain View, CA (US)

(73) Assignees: Bosch Energy Storage Solutions LLC, Farmington Hills, MI (US); Robert Bosch GmbH, Stuttgart (DE)

( * ) Notice: Subject to any disclaimer, the term of this patent is extended or adjusted under 35 U.S.C. 154(b) by 371 days.

(21) Appl. No.: 14/211,284

(22) Filed: Mar. 14, 2014

(65) Prior Publication Data

US 2014/0200723 A1 Jul. 17, 2014

Related U.S. Application Data

(63) Continuation-in-part of application No. 13/719,548, filed on Dec. 19, 2012, now Pat. No. 9,312,698.

(60) Provisional application No. 61/786,928, filed on Mar. 15, 2013.

(51) Int. Cl.
*H02J 3/00* (2006.01)
*H02J 3/32* (2006.01)
(Continued)

(52) U.S. Cl.
CPC ............. *H02J 3/32* (2013.01); *G06Q 10/04* (2013.01); *G06Q 50/06* (2013.01); *H02J 3/28* (2013.01); *H02J 3/381* (2013.01); *H02J 3/382* (2013.01); *H02J 3/383* (2013.01); *H02J 3/386* (2013.01); *Y02E 10/563* (2013.01); *Y02E 10/566* (2013.01); *Y02E 10/763* (2013.01); *Y02E 10/766* (2013.01); *Y02E 40/76* (2013.01); *Y02E 70/30* (2013.01); *Y04S 10/545* (2013.01)

(58) Field of Classification Search
None
See application file for complete search history.

(56) References Cited

U.S. PATENT DOCUMENTS

| 5,225,712 A | 7/1993 | Erdman |
| 6,055,163 A | 4/2000 | Wagner et al. |

(Continued)

FOREIGN PATENT DOCUMENTS

| JP | 2011027376 A | 2/2011 |
| JP | 2013027285 A | 2/2013 |

OTHER PUBLICATIONS

Stluka, Petr, Energy Management Solutions for Campuses, Honeywell Energy Management, Nov. 11, 2010.
(Continued)

*Primary Examiner* — Christopher E Everett
(74) *Attorney, Agent, or Firm* — Maginot Moore & Beck LLP (57) ABSTRACT

A Dispatch Planner (DP) is a component in an Energy System Controller that controls the operation of energy resources interconnected into one energy system to provide optimal energy management for a customer. In one embodiment, the energy storage system includes an electric load, dispatchable sources of energy such as an electrical grid, diesel generators, combined heat and power generators; renewable sources of energy such as photo-voltaic cells and wind turbines; and stored energy resources such as electrochemical batteries or pumped hydro reserves.

11 Claims, 3 Drawing Sheets

(51) Int. Cl.
*G06Q 50/06* (2012.01)
*H02J 3/28* (2006.01)
*G06Q 10/04* (2012.01)
*H02J 3/38* (2006.01)

(56) References Cited

U.S. PATENT DOCUMENTS

| | | |
|---|---|---|
| 6,785,592 B1 | 8/2004 | Smith et al. |
| 7,844,370 B2 | 11/2010 | Pollack et al. |
| 8,019,697 B2 | 9/2011 | Ozog |
| 8,095,245 B1 | 1/2012 | Mannepalli et al. |
| 8,364,609 B2 | 1/2013 | Ozog |
| 2002/0029097 A1 | 3/2002 | Pionzio, Jr. et al. |
| 2005/0039787 A1 | 2/2005 | Bing |
| 2005/0127680 A1 | 6/2005 | Lof et al. |
| 2005/0234600 A1 | 10/2005 | Boucher et al. |
| 2008/0039979 A1 | 2/2008 | Bridges et al. |
| 2009/0043519 A1 | 2/2009 | Bridges et al. |
| 2010/0179704 A1 | 7/2010 | Ozog |
| 2010/0198421 A1 | 8/2010 | Fahimi et al. |
| 2010/0217550 A1 | 8/2010 | Crabtree et al. |
| 2011/0015799 A1 | 1/2011 | Pollack et al. |
| 2011/0040550 A1 | 2/2011 | Graber et al. |
| 2011/0307110 A1 | 12/2011 | Sharma et al. |

OTHER PUBLICATIONS

International Search Report and Written Opinion corresponding to PCT Application No. PCT/US2014/028077, mailed Jul. 9, 2014 (10 pages).

SYSTEM AND METHOD FOR ENERGY DISTRIBUTION

CLAIM OF PRIORITY

This application is a continuation-in-part application of copending U.S. Non-Provisional patent application Ser. No. 13/719,548, which is entitled "System and Method For Energy Distribution," and was filed on Dec. 19, 2012, the entire contents of which are hereby incorporated by reference herein. This application claims further priority to U.S. Provisional Patent Application No. 61/786,928, which is entitled "System and Method for Energy Distribution" and was filed on Mar. 15, 2013, the entire contents of which are hereby incorporated by reference herein.

FIELD

This disclosure relates generally to the field of energy distribution and, more specifically, to systems and methods for controlling the storage and distribution of energy generated by multiple sources.

BACKGROUND

Existing energy system architectures can include a logic-based controller implementing simple control logic to dispatch energy from an energy storage device, such as electrochemical batteries, to a load. The logic-based controller includes a predetermined set of thresholds and time stamps that define when a given energy storage device stores energy or is charged from available resources and when the storage device releases energy to a load. Examples of such logic-based controllers include load following controllers and cycle-charging controllers. With a load-following controller, the storage device is charged with energy provided by renewable resources when the energy is available and is discharged during a specified time of the day or when the load exceeds a specified threshold. With a cycle-charging controller, the storage device is charged when a dispatchable resource, such as a diesel generator, is running while also providing power to the load, and is discharged similarly to the load-following strategy.

Utilization of energy storage devices, such as electrochemical batteries, in energy systems that supply electrical energy to residential, commercial or other loads brings many new opportunities in energy-savings, reduces requirements for distribution infrastructure, and integrates renewable resources into the electrical grid. Unlike conventional devices, which require a balance of the amount of energy generated and consumed in a grid at every instant of time, storage devices allow temporal shifting of electrical energy generation and consumption. As a consequence, excess renewable energy or low-priced electrical energy from the grid, can be stored, and provided on demand when this energy is required or expensive. At the same time, utilization of energy storage devices leads to new technical challenges related to the planning of optimal operation of these devices. Consequently, improvements to energy storage control systems that increase the efficiency of storage and utilization of energy from multiple energy generation sources would be beneficial.

SUMMARY

In one embodiment a method for controlling energy distribution has been developed. The method includes receiving with a controller first prediction data corresponding to available power generated from a renewable energy resource over a predetermined first time period and second prediction data corresponding to power demand for at least one load over the predetermined first time period, generating with the controller a first constraint model corresponding to power generation capacity of the renewable energy resource over the predetermined first time period with reference to the first prediction data, generating with the controller a second constraint model corresponding to power demand of the at least one load over the predetermined first time period with reference to the second prediction data, generating with the controller a first plurality of power control commands with reference to the first constraint model and the second constraint model, the first plurality of power control commands being generated to control operation of the renewable energy resource within constraints in the first constraint model to supply power to the at least one load within constraints in the second constraint model over the predetermined first time period, and operating with the controller the renewable energy resource with reference to the first plurality of power control commands to adjust a level of power output from the renewable energy resource within a first plurality of constraints in the first constraint model to provide power to the at least one load within a second plurality of constraints in the second constraint model.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
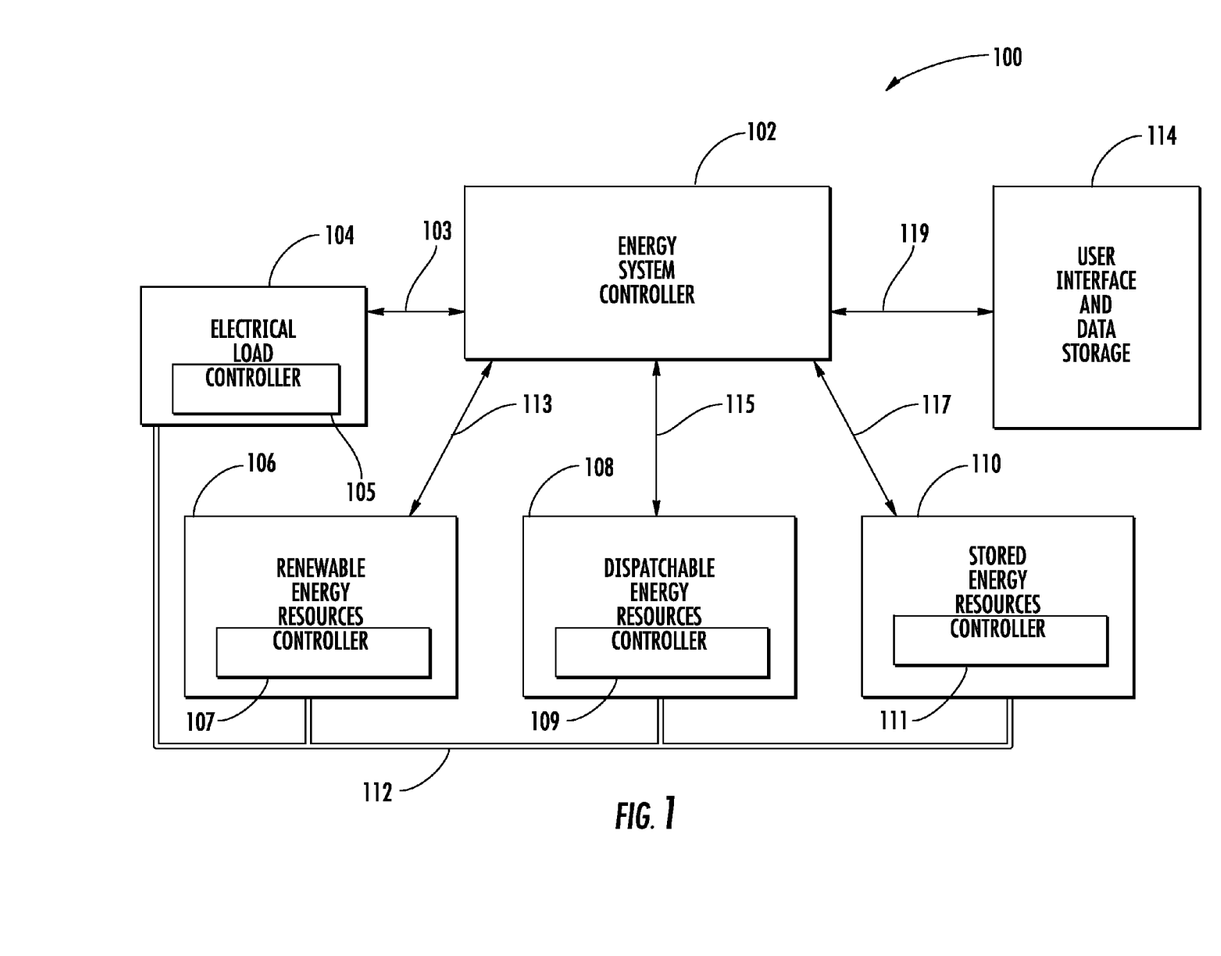
FIG. 1 is schematic block diagram of an energy storage system.

FIG. 1 illustrates an energy system 100 that maximizes benefits of an energy system having one or more integrated energy resources. The energy system 100 includes an energy system controller 102 operatively coupled to an electrical load 104, through a communications line 103, which in one embodiment includes one or more electrical loads. The energy system controller 102 is also operatively coupled to one or more energy resources, including renewable energy resources 106 through a communications line 113, dispatchable energy resources 108 through a communications line 115, and stored energy resources 110 through a communications line 117. The electrical load 104, the renewable energy resources 106, the dispatchable energy resources 108, and the stored energy resources 110 are each operatively coupled to a power line 112 which provides for the transmission of energy from one or more of the energy resources to another energy resource and to the electrical load 104. A user interface, or human machine interface (HMI), and a data storage device 114 are also operatively coupled to the energy system controller 102 through a communications line 119. The communications lines 103, 113, 115, 117, and 119 are either hardwired or wireless or a combination thereof.

The energy system controller 102 integrates a plurality of components, devices or subsystems that provide for the prediction of energy generation, the planning of energy delivery and storage, and the selective transmission or delivery of power from an energy generation device or an energy storage device to a load or an energy generation device. When the components, devices or subsystems are integrated into a single control system, the flow of energy is seamlessly delivered between the load, energy storage devices, dispatchable energy resources, and renewable resources to the benefit of the user. The controller 102 is operatively coupled to a controller 105 of the electrical load 104, a controller 107 of the renewable energy resources 106, a controller 109 of the dispatchable energy resources 108, and a controller 111 of the stored energy resources 110. Each of the controllers, 105, 107, 109, and 111 in different embodiments, include processors and memories and receive and provide information in the form of signals to and from the controller 102. In addition, the controllers 105, 107, 109, and 111 in different embodiments include control hardware, including switching devices to provide for the generation and transmission of energy or the storage of energy within the energy system 100. The energy system 102 obtains status information from each of the resources 106, 108, and 110 as described later and also provides control signals to the controllers 105, 107, 109, and 111 for the generation and transmission or storage of energy in the system 100. The controller 102 is also operatively coupled to the controller 105 to receive status information of the load 104 indicative of the energy required by the load.

The controller 102 in different embodiments includes a computer, computer system, or programmable device, e.g., multi-user or single-user computers, desktop computers, portable computers and other computing devices. The controller 102 includes one or more individual controllers as described below and includes in different embodiments at least one processor coupled to a memory. The controller 102 includes in different embodiments one or more processors (e.g. microprocessors), and the memory in different embodiments includes random access memory (RAM) devices comprising the main memory storage of the controller 102, as well as any supplemental levels of memory, e.g., cache memories, non-volatile or backup memories (e.g. programmable or flash memories), read-only memories, etc. In addition, the memory in one embodiment includes a memory storage physically located elsewhere from the processing devices and includes any cache memory in a processing device, as well as any storage capacity used as a virtual memory, e.g., as stored on a mass storage device or another computer coupled to controller 102 via a network. The mass storage device in one embodiment includes a cache or other dataspace including databases.

The stored energy resources 110, in different embodiments, includes energy storage devices, such as electrochemical batteries such as those found in energy systems that supply electrical energy to residential loads, commercial loads or other types of loads and pumped hydro reserves. Utilization of the energy storage devices provides benefits in energy-savings by reducing the requirements for a distribution infrastructure and for integrating renewable energy resources into the electrical grid. Unlike conventional dispatchable resources which require a balance between the amount of energy generated and consumed by a grid at any instant of time, one or more storage devices enable the shifting of electrical energy consumption and energy generation from one period of time to another period of time. As a consequence, the energy generated by one or more renewable resources 106 which exceeds the amount of energy required by a given load at a certain time to satisfy energy demand, in one embodiment, is stored in the energy storage resources 110. Renewable energy resources include wind turbines, solar panels, biomass plants, hydroelectric power plants, geothermal power installations, tidal power installations, and wave power installations. In addition low cost energy which is provided by the electrical grid at a low price during periods of low demand by the load 104 is also being stored. The stored energy is then being provided on demand when energy is required or when other forms of energy are more expensive. Dispatchable energy resources also include hydro-power, coal power, diesel generators, electrical grid connection, and gas power.

The use of energy storage resources 110 also provides a reliable supply of electrical power to maximize the benefits provided to owners, managers, or users of the energy system 100. Consequently, the described system and method for energy distribution including the energy system controller 102 realize the benefits of an energy storage system represented, for example, by a battery installation, while providing a reliable source of energy that satisfies load demand at substantially any and at all times. The energy system controller 102 is configured to plan for the optimal operation of many different types and configurations of energy systems.

Figure 2:
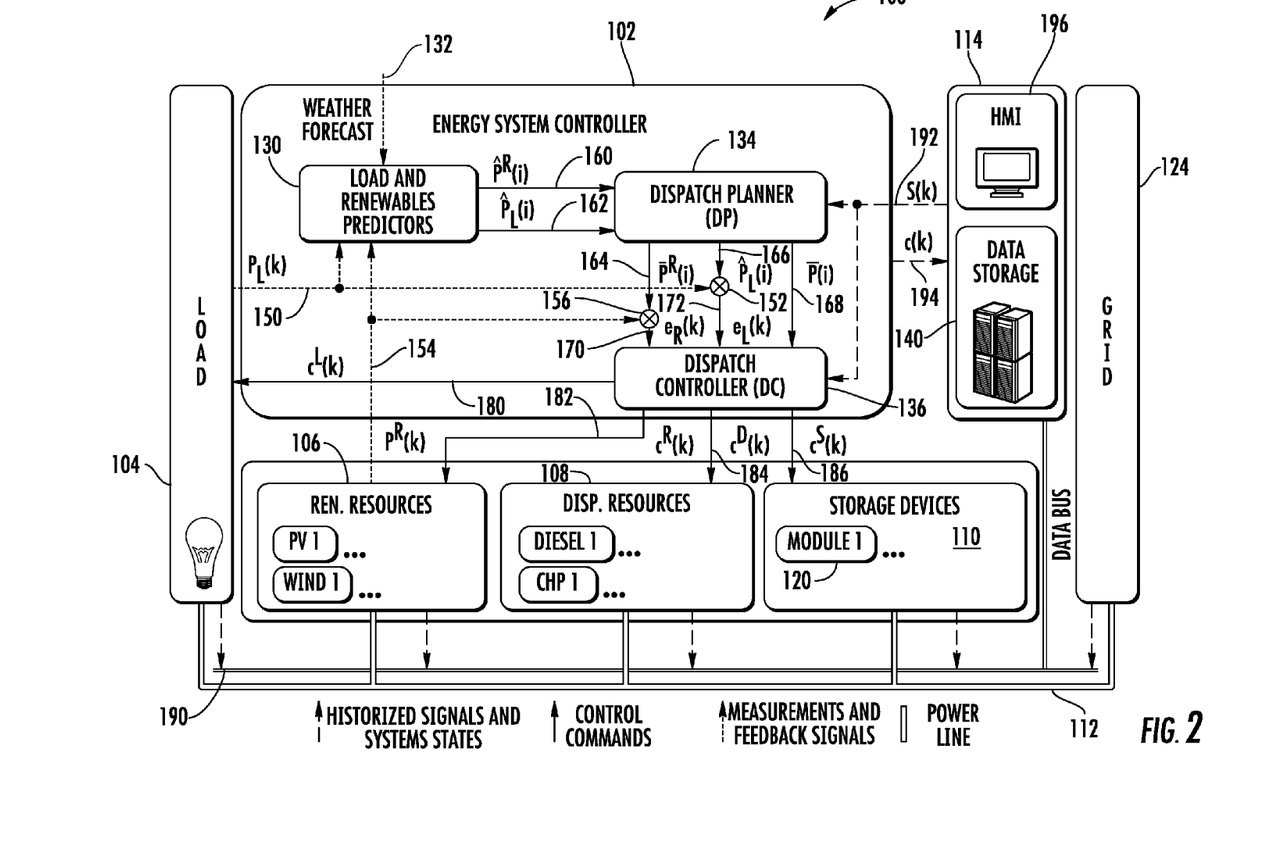
FIG. 2 is a detailed schematic block diagram of the energy system of FIG. 1.

As illustrated in FIG. 2, the control system architecture 100 maximizes the benefits of an energy system with integrated stored energy resources 110, here labeled as energy storage devices 110. One or more energy storage modules 120 are operatively connected to the power line 112 which couples the electrical load 104 to an energy grid 124. The module 120 represents different or similar types of energy storage devices. In addition, the renewable energy resources 106 and the dispatchable energy resources 108 are also coupled to the power line 112. To provide for the distribution of energy from the grid 124 and the resources 106, 108, and 110, energy system controller 102 includes three components or devices that individually and/or collectively solve the tasks of power prediction, power dispatch planning, and execution of power dispatch. A load and renewable predictors module 130 provides for a prediction of the power which is generated by the renewable resources 106 which in different embodiments is dependent upon a weather forecast received at an input 132 to the module 130. A dispatch planner module 134 provides for the planning of the generation and the release or discharge of energy to the load 104. A dispatch controller 136 dispatches or directs the flow of energy provided by the renewable resources 106, the dispatchable resources 108, and the energy stored in the storage devices 110 to the power line 112. Each of the load and renewable predictors module 130 and dispatch planner module 134 are embodied in one embodiment as modules including software resident in the controller 102 or which is one embodiment configured as individual device controllers. In addition, the dispatch controller 136 in one embodiment is embodied as a module including software or as a device controller. While the modules 130, 134 and controller 136 in one embodiment are located at a single predetermined location, each of the modules 130. 134 and controller 136 in other embodiments are remotely located apart from each other if desired.

When the load and renewable predictors module 130, the dispatch planner module 134, and the dispatch controller 136 are integrated into the energy system controller 102, the modules 130, 134, and controller 136 in one embodiment direct the flow of energy and the amount of power available for the load 104 for/from the energy storage devices 110 and from the dispatchable resources 108, and the renewable resources 106 to maximize benefit of the user, which includes a cost benefit and an energy delivery benefit including the amount of electrical power and a time of its delivery.

FIG. 2 illustrates the power line 112 which provides the electrical power connections to the renewable resources 106, the dispatchable resources 108, the energy storage devices 110, and to the electrical grid 124. The energy system controller 102 receives power measurements from the load, a status of renewable and dispatchable resources and storage devices, and receives historized operation and performance data from a data storage unit 140 coupled to the controller 102. In addition, the energy system controller 102 generates power control commands for the renewable resources 106, the dispatchable resources 108, and the storage devices 110.

The controller 102 includes a plurality of inputs to receive measurement and/or status signals. As described above, the input 132 provides weather information to the predictors module 130. The weather information is obtained from any number of providers including commercial weather prediction vendors and the NOAA National Weather Service. An input 150 to the module 130 provides a signal indicative of the present or current power requirement or status of the load 104, which is also provided to a comparator 152 to be described later. An input 154 to the predictors module 130 is received from the renewable resources 106 and provides status information of the amount of power currently being produced by the renewable resources 106. The status information provided by the input 154 is also provided to a comparator 156 to be described later.

Control commands are generated internally by the controller 102. The predictor module 130, for instance, generates signals over first and second predictors module outputs 160 and 162 which are received as inputs by the planner module 134. Similarly, in response to the signals received over the first and second predictors module 130 outputs 160, 162, the planner module 134 generates signals through planner module 134 outputs 164, 166, and 168. The signal at the output 164 is applied to the comparator 156 and combined with the signal at the output 154 generated by the renewable resource 106. The signal at the output 166 is applied to the comparator 152 and combined with the signal generated by the load 104 over the input 150. An output 170 of the comparator 156 is applied as an input to the dispatch controller 136. An output 172 of the comparator 152 is applied as an input to the dispatch controller 136. The dispatch controller 136 includes an output 180 coupled to the load 104, an output 182 coupled to the renewable resources 106, an output 184 coupled to the dispatchable resources 108, and an output 186 coupled to the storage devices 110.

In addition to the feedback and control commands described above, additional control information is transmitted over a data bus 190 coupled to the load 104, the renewable resources 106, the dispatchable resources 108, the storage devices 110, the data storage unit 140, the HMI 196, and the grid 124. The data bus 190, which includes other types of communication channels, transmits data that is used to communicate command signals and variables required for operation of the system 100. The data storage unit 140 stores data and transmits data upon demand from the controller 102. An output 192 from unit 196 is coupled to the controller 102 and an input 194 to the unit 196 is coupled to the controller 102 to receive command signals. A system operator or user accesses and/or manipulates data stored in the data storage unit 140 or data received from the controller 102 over the output 194. A user interface 196 (HMI) enables a user to access information about the state of the system 100, which in one embodiment is stored in the data storage 140 or received over the output 194.

Figure 3:
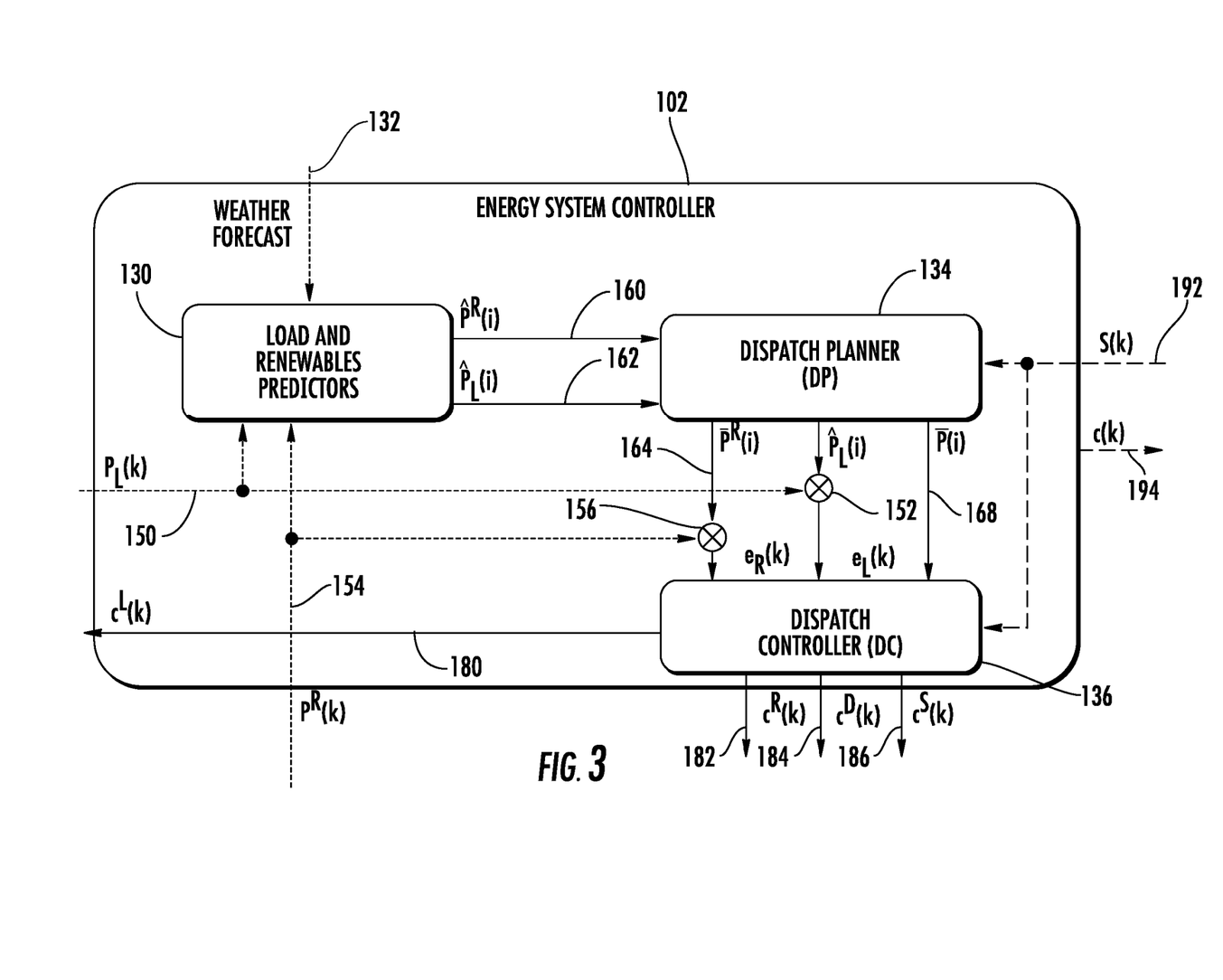
FIG. 3 is a schematic block diagram of an energy system controller.

FIG. 3 illustrates a detailed view of the energy system controller 102 and the configuration and types of signals being transmitted internally between the modules 130, 134, and controller 136 and externally to and from the load 104, the resources 106, 108, and 110, and to and from the HMI 196 and data storage unit 140. The load and renewables predictors module 130 generates a prediction of the requirements of the load, $\hat{P}_L(i)$ over the output 162 on a predetermined prediction time period which is referred to as a time horizon, $T_H$, and a prediction of the power to be generated or provided by the renewable resources $\hat{P}^R(i)$ which is transmitted over the output 160 using the same time horizon as used for the load signal at 162. These predictions are transmitted to the dispatch planner module 134 which processes the information and responsively generates a plurality of signals to control the operation of the energy system 100 on the time horizon $T_H$.

The dispatch planner 134 generates baseline power control commands (a vector of reference signals) $\overline{P}(i)$ for the dispatchable resources 108 on the output 168 for transmission to the dispatch controller 136. The dispatch planner module 134 also generates baseline power control commands (a vector of reference signals) for the renewable resources $\overline{P}^R(i)$ over the output 164 which along with the load prediction $\hat{P}_L(i)$, transmitted on the output 166, are compared respectively with the corresponding measurements of the power provided by the renewable resources, $P^R(k)$ at comparator 156, and the load $P_L(k)$ at comparator 152, to generate error signals $e_R(k)$ and $e_L(k)$ respectively. The error signals and the reference signal for the dispatchable resources are then provided to the dispatch controller 136 that computes control commands for transmission to the renewable resources 106 ($c^R(k)$), dispatchable resources 108, ($c^D(k)$), storage devices 110, ($c^s(k)$), and the load 104, ($c^L(k)$). These control commands are provided to individual devices and implemented by the local controllers or a controller in communication with the device. The associated controller controls at least one switch at each of the resources 106, 108, and storage devices 110 to control the release of energy to the power line 112. The error signals indicate a difference between a predicted or planned power values and actual values of the load or power generation of the renewable resources, for instance.

In order to maximize the benefits provided by energy storage devices 110, operation of the energy storage devices 110 is planned on a sufficiently long time horizon, $T_H$, in the future so that the storage devices 110 in one embodiment is charged when energy in the system 100 is most readily available and/or least expensive. In different embodiments, the time horizon includes one or more hours, one or more days, or one or more weeks or other long time horizons. The stored energy is then provided on demand to the load 104 when the energy is most needed or when a predetermined level of savings is achieved if the load is being controlled to reduce load requirements. The dispatch planner module 134 in one embodiment performs an optimized planning of power profiles for the energy storage devices and other energy resources in the system by solving a numerical optimization problem using an optimization program or algorithm resident in firmware or software of the module 130 including memory associated with the module 130. Software resident at the user interface 114 in one embodiment is also used. In one embodiment, the long time horizon extends for one or more weeks, and the time periods used during the longer time horizon vary. For instance, during a first week, determinations of future power used and further power generation are made every hour. During a second week, determinations are made every six hours, and during a third week determinations are made very twelve hours. The determination of time periods in one embodiment is determined based on the accuracy of the weather predictions. When weather predictions are more accurate, for instance during a first week in the future, the determinations are made more often than during a second week in the future when weather predictions become less accurate.

The optimization problem is formulated with a cost function and takes into account the cost of energy, demand charges, battery efficiencies and life to depletion, maintenance and replacement costs for each component of the energy system, and other parameters that influence operating costs of the energy system 100 for a specified time horizon $T_H$. In addition to the cost function, the optimization program takes into account all the constraints imposed on different components of the system such as power limits for various resources, available amounts of energy stored in different energy storage devices, and safety constraints. These algorithms and others described herein in one embodiment are embodied as program code or program instructions in software and/or firmware resident in one of the modules, the controller, in the user interface 114, or remote devices which are coupled to the system 100 through hardwired connections, connections to the internet, or other means of communication to software or firmware either wired or wireless.

To solve the described optimization problem, the dispatch planner module 134 receives a forecasted load profile over the specified time horizon $T_H$, profiles of power that are forecasted to be generated by the renewable resources over the same time horizon, and present states of energy system components such as the amount of fuel available for dispatchable resources and the amount of energy available from various storage devices. Information about the states of components of the energy system is provided to the dispatch planner module 134 by signal S(k) over the output 192 from data storage unit 140 of FIG. 2. Information indicative of the future load profile and power profiles from renewable resources 106 is provided to the dispatch planner module 134 by the load 104 and renewables predictors module 130.

Since at any given instant of time, the future load profiles of the load 104 and the future power profiles available from the renewable resources 106 are unknown, such profiles are forecasted. The load and renewables predictors module 130 includes a number of predictor algorithms that generate forecasts of the future load requirements of load 104 and the power anticipated to be available from renewable resources 106 on the prediction time horizon $T_H$. For example in an energy system 100 having one load connection, one photovoltaic (PV) installation, (typically including large arrays of PV cells), and one wind turbine, three predictors are provided for each one of these components. Each of these predictors is represented by a mathematical model of the considered component (e.g. load, PV installation, wind turbine) and models of physical processes that influence power consumption or generation of a given component. The predictors module 130 receives measurements of the power available from or provided to the component as well as other inputs that influence the power profile and generates a prediction of the power profile. These predictions are provided to the dispatch planner module 134 in the form of signals $\hat{P}_L(i)$ for the load 104 and $\hat{P}^R(i)$ for the renewable resources 106.

For example, the load predictors module 130 in one embodiment is implemented with a neural network model of the load 104 that is populated or trained with historical load profiles of the energy system 100 and is capable of generating a forecast of the load 104 which occurs in the future on a timeline horizon of several hours or one or more days. In one example for instance, power requirements of a load are predicted based on power usage during a workweek as opposed to power usage during a weekend. Neural networks are known and are used in one embodiment.

The load predictors module 130 in one embodiment utilizes past measurements of the load power requirements as well as other variables such as current and future time variables, day of the week, time of the year, weather forecast on the specified time future horizon and other variables to generate the prediction $\hat{P}_L(i)$. A predictor algorithm for the PV installation in one embodiment is embodied by in program code providing a deterministic model that computes solar irradiance at a given geographical location for any time of the day and year which is adjusted by a weather forecast predicting cloud cover, humidity and other atmospheric parameters for time $T_H$ in the future. The solar irradiance is considered in one embodiment as a part of the weather forecast. The power provided by the PV installation is determined than from the solar irradiance utilizing the mathematical model mapping irradiance into the power output. Similarly, the wind power predictor in one embodiment utilizes a mathematical model of the installed wind turbine along with the weather forecasts about temperature, humidity, wind speed and direction for the next time horizon $T_H$. Signal $P^R(k)$ provides information about the power generation by renewable resources at time instant k that is used by the predictors of the renewable power.

In one embodiment, a dispatch strategy computed by the dispatch planner module 134 relies on the prediction of load 104 and power available from the renewable resources 106. Due to prediction uncertainties and errors, modeling inaccuracies, and temporal variations in load profiles, and renewable profiles, a mismatch in one embodiment occurs between the predicted load and power profiles and the true load and power profiles. In addition to that mismatch, since both the predictors module 130 and dispatch planner module 134 need time to compute the predictions and the optimal dispatch strategy for the next time horizon, the predictors module 130 and dispatch planner module 134 of the energy system controller 102 in one embodiment operate at a sampling rate less than the speed required to compensate for an instantaneous variation of load demand and power supply. To compensate for the potentially faster variations of load demand and power supply from the renewable resources, the control system incorporates the dispatch controller 136. The dispatch controller 136 uses optimally planned profiles generated by the dispatch planner module 134 as reference inputs, and computes the errors, $e_R(k)$ and $e_L(k)$, between the predicted profiles and the measurements collected at a high sampling rate, and generates final command inputs to the energy system resources. In one embodiment, the predictors module 130 and the dispatch planner module 134 operate at a sampling rate of approximately between 15 minutes and 1 hour. This sampling rate is limited by the update rate of forecasts for the load 104 and renewable resources 106 and by the amount of time required to perform the optimization.

The dispatch planner module 134 implements cost and constraint models for each energy resource and the system as a whole. As shown in FIG. 3, the dispatch planner module 134, receives information about predicted load ($\hat{P}^L(i)$) and renewable power ($\hat{P}^R(i)$) from the predictors module 130. The dispatch planner module 134 uses the prediction data to implement cost and constraint models for generation of optimal reference power commands for the various resources 106 while ensuring that all constraints are satisfied. As used herein, $\overline{P}^R(i)$ denotes the reference command for renewable resources, $\overline{P}(i)$ denotes the reference commands for dispatchable resources, and $\overline{P}^L(i)$ denotes the reference commands for loads. The constraints and optimization processes for satisfying the constraints are described below.

The dispatch planner module 134 performs an optimization process with reference to a vector of power variables $P=[P^1, P^2, \ldots, P^n]$ for various power resources 106 over a time horizon. The optimization process uses one or more constraints in constraint models to generate power variable values and corresponding operating commands that satisfy the constraints. Examples of constraint types that are included in the constraint models include bound constraints $LB \leq P \leq UB$, where LB and UB are vectors of power variables that correspond to lower and upper bounds, respectively, linear equality constraints $AP=B$, where A is a matrix and B is a vector, linear inequality constraints $AP \leq B$, where A is a matrix and B is a vector, non-linear equality constraints $g(P)=0$, and non-linear inequality constraints $g(P) \leq 0$.

The constraints pertain either to individual resource constraints, such as constraints on the power generation capacity of renewable and non-renewable energy resources, constraints on the power consumption demands for loads, constraints on the capacity of energy storage resources, and to constraints for the entire energy storage system. Resource constraints include storage state of charge constraints, storage power constraints, renewable power constraints, and grid power constraints. The storage state of charge is a non-negative number that always lies between a lower bound (e.g. 20%) and an upper bound (e.g. 100% or fully charged). The storage power constraints correspond to the maximum permissible power (charge or discharge) at the storage terminal is a function of the instantaneous storage state of charge. The renewable power constraints correspond to the maximum permissible power available from a renewable resource, such as PV, which is dependent on the available solar irradiation. The grid power constraints corresponding to the electrical grid 124 impose restrictions on the maximum power levels that are drawn from the energy grid 124 during operation. Alternative embodiments include additional restrictions, such as restrictions on the maximum amount of power that is fed into the energy grid 124 by the energy system.

System constraints pertain to deferrable and non-deferrable loads. A non-deferrable load refers to a load that requires electrical power with substantially zero delay at levels that are determined by the requirements of the load. A deferrable load refers to a load that requires electrical power but where the distribution of electrical power over time can be modified while satisfying the constraints for the load. The constraints for the combination of the deferrable and non-deferrable loads correspond to the varying range of expected load demand levels for the loads including minimum demand levels and maximum demand levels over the time horizon. The combined energy resources in the system need to satisfy non-deferrable loads, such as lighting and HVAC, at every instant. Other loads may be deferrable and need to be satisfied only prior to a predetermined time deadline. For example, in one configuration the exact time of charging an electric vehicle during nighttime hours is not a high-priority constraint as long as a total amount of energy (e.g. 70 kWh) is delivered prior to a predetermined deadline while meeting constraints for the power distribution system such as the maximum power level that can be delivered to the vehicle through the electric grid. For charging the vehicle, the constraint is met as long as the system fully charges the battery in the vehicle by, for example, 6 AM local time in the location of the vehicle charger. The dispatch planner module 134 identifies predicted "off peak" periods of reduced utilization when the predicted demand for power from the renewable energy resource is less than the maximum available capacity for power generation that is predicted for the renewable energy resource 106. The dispatch planner module 134 generates a profile with power control commands to increase the generation during the predicted off peak periods to accommodate the deferred load while operating the renewable energy resource 106 within the predicted maximum power generation constraint.

In one configuration, dispatch planner module 134 optimizes for minimizing the levelized cost of electricity (LCOE) given the system constraints. The LCOE over a time horizon is defined as the cost of using the energy system per kWh of load supplied. The LCOE has several components such as grid energy cost ($/kWh), grid demand charges ($/kW), storage cost ($/kWh), diesel fuel cost ($/kWh), and the like. The dispatch planner module is configured to optimize the LCOE for different application cases including reduction in demand charges, time-of-usage tariffs, and optimized utilization of conventional power plants. The reduction in demand charge optimization is directed to systems that are charged for energy consumption ($/kWh) and the peak energy consumption ($/kW) by the utilities. The demand charges are made to recoup the costs of sizing the transmission and distribution infrastructure to accommodate the peak loads. The system 100 uses the stored energy resources 110 to supply the peak loads while charging during off-peak times. This time shifting reduces the demand charges for the customer. The time-of-usage tariffs are charged based on the variations in the costs of production and availability of renewable energy resources 106. The dispatch planner module optimizes the usage of the energy storage assets 110 to enable the customer to realize benefits by moving consumption from the energy grid 124 from peak hours to off-peak hours. The dispatch planner 134 performs optimization of the utilization of conventional power plants to minimize the need to increase or decrease the power demand for conventional power plants. During operation of a conventional power plant, a rapid increase or decrease in the electrical demand on the power plant causes inefficient operation and increases the cost of operating the power plant. The dispatch planner 134 increases or decreases the usage of the energy storage assets 110 to reduce the variation in the load demand on the conventional power plants.

In another configuration, the dispatch planner module 134 optimizes for minimizing emissions from polluting energy resources given the system constraints. For example, energy resources, such as coal or gas-fired power plants, generate gas emissions that are harmful to the environment. Frequent ramping up or down of the polluting energy generation assets to satisfy the load results in a significant increase in emissions. In an emission optimization process, the dispatch planner module optimizes the power draw from the polluting energy resources to enable operation of the polluting resources within a predetermined load range and to supply the balance energy from a renewable source 106 or storage resource 110. The predetermined load range refers to relative draw from an energy resource compared to the total power generation capacity of the resource and can be expressed as a percentage of the total capacity of the non-renewable energy resource. For example, a coal-fired power generator resource is operates in a load range of 40% of the maximum load up to 80% of the maximum load over a predetermined period of time without dropping below the minimum 40% load or rising above the maximum 80% load. Operating the non-renewable resource within the predetermined load range reduces overall emissions that are incurred when the resource is deactivated and restarted or when the resource operates at maximum capacity.

In various embodiments, the dispatch planner module uses standard or custom optimization processes to minimize the cost function or uses rule-based custom algorithms subject to the operating constraints. The optimization processes include gradient-based or gradient-free methods, dynamic programming, integer programming, genetic algorithms, and simulated annealing. The rule-based custom algorithms include storage charging and discharging schedules based on load thresholds and renewable availability. The dispatch planner module 134 is implemented using one or more digital processing devices including, but not limited to desktop, server, and mobile personal computers (PCs), a Programmable Logic Controller (PLC), or a microprocessor or Electronic Control Unit (ECU).

To compensate for the errors which accumulate due to prediction inaccuracies and temporal variations, the dispatch controller 136 compares reference inputs from the dispatch planner with the measurements received from the load $P_L(k)$ and renewable resources $P^R(k)$, computes the corresponding errors $e_L(k)$, $e_R(k)$ and augments reference commands from the dispatch planner module 134 with correction signals to generate power commands $c^D(k)$ to dispatchable resources 108, power commands $c^s(k)$ storage devices 110, throttling commands $c^R(k)$ to renewable resources 106 and, if load devices allow demand management, load regulation commands $c^L(k)$ to the load 104. In one embodiment command signals generated by the dispatch controller 136 are computed by augmenting the reference signals received from the dispatch planner module 134 with corrections that constitute fractions of the combined error, $e(k)=\Sigma e_R(k)-\Sigma e_L(k)$.

The throttling commands are generated in situations when the renewable resources 106 provide or are providing more power at a given sample time k than the amount of power than is capable of being absorbed by the load 104, storage devices 110 or the dispatchable resources 108. The throttling commands are transmitted to the renewable resources 106 to reduce the amount of energy being generated by the renewable resources. In the case of the PV arrays, in one embodiment the alignment of the arrays with respect to the sun are adjusted to misalign the arrays with respect to the path of sunlight, or in another embodiment the connection to the power line 112 is disconnected. In the case of wind turbines and in different embodiments, the blade angle is adjusted to limit the amount of rotation or the blades are disconnected from the gearbox or generator.

The sampling time for the dispatch controller 136 is denoted by k, while the sampling time for the predictors module 130 and the dispatch planner module 134 are denoted by i. This distinction is made to indicate that the sampling rate of the predictors module 130 and dispatch planner module 134 is slower than the faster sampling rate of the dispatch controller 136. In one embodiment, the sampling rate of the dispatch controller 136 is on the order of fractions of a minute to several seconds, milliseconds or other short time intervals. This sampling rate is limited by the sampling rates of the measurement devices acquiring instantaneous power of the load and the renewable resources and the amount of time required to generate the control commands $c^R(k)$, $c^D(k)$, $c^s(k)$, $c^L(k)$.

The dispatchable energy resources 108 provide energy at times when the renewable energy resources 106, stored energy resources 110 are insufficient to meet the energy requirements of the load 104. In one embodiment, the dispatchable energy resource 108 provides a load matching function to provide an output to match the shape of the load demand. In another embodiment, peak matching is also provided to match the highest energy demand occurring during a certain time of day. Such time is predicted based on time of day, pattern of energy use, weather, and geographic location. The dispatchable energy resource 108 in other embodiments also cover lead-in times where some resources, such as coal powered plants, take a certain amount of time to ramp up to the desired output. Frequency regulation is also provided in some embodiments.

The control system architecture 100 facilitates robust operation in the presence of potential problems or failures in individual system components. For example, in one embodiment each one of the three modules 130, 134, and the controller 136 are implemented on an individual processor, server, programmable logic controller (PLC) or another computing device such that when one of these modules or controllers fail, one or more of the other modules or controller continue operation. In one embodiment, when each of the three components 130, 134, and 136 of the control system are implemented on the same device, as hardware, firmware or software, each is implemented as individual devices or programs, or program code, running independently and exchanging information between each other in order to provide the robust operation, such that power continues to be supplied if one of the components fails. In one embodiment, each of the components 130, 134, and 136 are independent of the other to provide for the failure of one or more of the other components.

If, for example, the predictors module 130 does not receive a weather update or fails to provide a new prediction at a certain time, the dispatch planner module 134 uses the predictions stored in an associated memory, or stored in the data storage 140, from the previous forecast, extrapolates the predictions one unit of time into the future according to a chosen rule, and generates a set of new reference signals for the dispatch controller 136. Such operation continues until the predictors module 130 restores its functionality and starts providing the forecast again. In this situation, the operation of the energy system 100 deviates from an optimal operation, but the controller 102 continues to reliably coordinate the transfer of power between the load 104 and the resources 106, 108, and 110. In another embodiment, if the dispatch planner module 134 fails, then the dispatch controller 136 uses the planned profiles received from the dispatch planner module 134 during the previous period and continues control of the system power until the planner module 134 operation is restored. In another embodiment, if the predictors module 130 or the dispatch planner module 134 fails for a sufficiently long period of time, longer than the prediction horizon of several hours or days, the dispatch controller 136 resorts to a logic-based control of the power transmission until full functionality of the controller 102 is restored.

In terms of reliable operation of the energy system 100, a significant component of the control architecture is the dispatch controller 136. In general and in one embodiment, the control system controls power flow between the energy system resources as long as the dispatch controller 136 continues to be operational.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method of controlling energy generation and distribution comprising:
   receiving with a controller first prediction data corresponding to available power generated from a renewable energy resource over a predetermined first time period and second prediction data corresponding to power demand for at least one load over the predetermined first time period;
   generating with the controller a first constraint model corresponding to power generation capacity of the renewable energy resource over the predetermined first time period with reference to the first prediction data;
   generating with the controller a second constraint model corresponding to power demand of the at least one load over the predetermined first time period with reference to the second prediction data;
   generating with the controller a first plurality of power control commands with reference to the first constraint model and the second constraint model, the first plurality of power control commands being generated to control operation of the renewable energy resource within constraints in the first constraint model to supply power to the at least one load within constraints in the second constraint model over the predetermined first time period; and
   operating with the controller the renewable energy resource with reference to the first plurality of power control commands to adjust a level of power output from the renewable energy resource within a first plurality of constraints in the first constraint model to provide power to the at least one load within a second plurality of constraints in the second constraint model.

2. The method of claim 1, further comprising:
   generating with the controller a third constraint model corresponding to power generation from a non-renewable energy resource;
   generating with the controller the first plurality of power control commands to generate first portion of the power for the at least one load with the renewable energy resource;
   generating with the controller a second plurality of power control commands for the non-renewable energy resource to generate a second portion of the power for the at least one load with the non-renewable energy resource; and
   operating with the controller the non-renewable energy resource with reference to the second plurality of power control commands to adjust a level of power output from the non-renewable energy resource within a third plurality of constraints in the third constraint model to provide power to the at least one load within the second plurality of constraints in the second constraint model.

3. The method of claim 2, the generation of the third constraint model further comprising:
   generating with the controller the third constraint model with a predetermined load range for the non-renewable energy resource to operate the non-renewable energy resource continuously without deactivating the non-renewable energy resource or operating the non-renewable energy resource at a maximum capacity during the predetermined first time period.

4. The method of claim 1 further comprising:
   receiving with the controller the second prediction data for the at least one load including prediction data for power demand of a deferrable load;
   identifying with the controller a time deadline during the predetermined first time period for delivery of power to the deferrable load;
   identifying with the controller a second time period prior to the time deadline during which the renewable energy resource is predicted to generate power with an available power level that is above a predicted demand level of the at least one load; and
   generating with the controller the first plurality of power control commands to operate the renewable energy resource to generate power at a level that is greater than the predicted demand level during the second time period to provide power to the deferrable load.

5. The method of claim 1 further comprising:
   receiving with the controller third prediction data for a capacity of an energy storage resource over the predetermined first time period, the energy storage resource being configured to receive power from the renewable energy resource at a first time and provide power to the at least one load at a second time after the first time;
   identifying with the controller a second time period prior during which the renewable energy resource is predicted to generate power with an available power level that is above a predicted demand level of the at least one load; and
   generating with the controller the first plurality of power control commands to operate the renewable energy resource to generate power for at a level that is greater than the predicted demand level during the second time period to provide power to the energy storage resource.

6. The method of claim 5, the generation of the first plurality of power control commands further comprising:
   generating with the controller the first plurality of power control commands to reduce generation of power from the renewable energy resource below a predicted power generation capacity for the renewable energy resource in the first prediction data in response to the predicted power generation capacity exceeding a first constraint for maximum power demand for the at least one load in the second constraint model and a second constraint for available storage capacity in the energy storage resource in the third constraint model.

7. The method of claim 1, the generation of the first constraint model further comprising:
   generating with the controller the first constraint model for the renewable energy resource with reference to a plurality of constraints corresponding to available power generation levels for the renewable energy resource over the predetermined first time period and to the first prediction data.

8. The method of claim 1, the generation of the second constraint model further comprising:
   generating with the controller the second constraint model for the at least one load with reference to a plurality of constraints corresponding to a range of load demand levels for the at least one load over the predetermined first time period and to the second prediction data.

9. The method of claim 1 the receiving of the first prediction data further comprising:
   receiving weather prediction data corresponding to a geographic location of the renewable energy resource.

10. The method of claim 1 the receiving of the second prediction data further comprising:
    receiving weather prediction data corresponding to a geographic location of the at least one load.

11. The method of claim 1, the generation of the first constraint model further comprising
    generating with the controller the first constraint model for the renewable energy resource with reference to the renewable energy resource being one of a photovoltaic array, a wind turbine, a hydroelectric power plant, a tidal power installation, and a wave power installation.

* * * * *